(12) United States Patent
Williams

(10) Patent No.: US 11,924,005 B2
(45) Date of Patent: *Mar. 5, 2024

(54) DEDICATED NETWORK GATEWAY DEVICE

(71) Applicant: ROCKPORT NETWORKS INC., Ottawa (CA)

(72) Inventor: Matthew Robert Williams, Kanata (CA)

(73) Assignee: ROCKPORT NETWORKS, INC., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/719,960

(22) Filed: Apr. 13, 2022

(65) Prior Publication Data

US 2022/0345333 A1 Oct. 27, 2022

Related U.S. Application Data

(63) Continuation of application No. 16/754,339, filed as application No. PCT/IB2018/057945 on Oct. 12, 2018, now Pat. No. 11,398,928.

(30) Foreign Application Priority Data

Oct. 12, 2017 (CA) ..................................... 2982147

(51) Int. Cl.
*H04L 12/66* (2006.01)
*G06F 13/40* (2006.01)
*H04L 12/46* (2006.01)
*H04L 49/00* (2022.01)
*H04L 49/15* (2022.01)

(52) U.S. Cl.
CPC .......... *H04L 12/66* (2013.01); *G06F 13/4068* (2013.01); *H04L 12/46* (2013.01); *H04L 49/15* (2013.01); *H04L 49/30* (2013.01)

(58) Field of Classification Search
None
See application file for complete search history.

(56) References Cited

U.S. PATENT DOCUMENTS

2004/0172658 A1* 9/2004 Rakib .................... H04L 69/168
725/111
2009/0216920 A1* 8/2009 Lauterbach ........... H04L 49/356
710/316

(Continued)

*Primary Examiner* — Eunsook Choi
(74) *Attorney, Agent, or Firm* — Mark Malek; Widerman Malek, PL

(57) ABSTRACT

A dedicated network gateway device capable of bridging, switching or routing network traffic between a traditional network and a direct interconnect network is provided. The device may include a host interface card having a first port, second port, and one or more computation devices. The first port may be a direct interconnect port connected to a direct interconnect network. The second port may be a traditional network port connected to switches and devices in the traditional network. The computation devices may be internally connected to the first and second ports. The host interface card may be connected to a host device via a communication bus. The host interface card may be capable of switching network traffic between the traditional and direct interconnect networks without intervention by the host device.

30 Claims, 19 Drawing Sheets

(56) References Cited

U.S. PATENT DOCUMENTS

| | | | |
|---|---|---|---|
| 2014/0269745 A1* | 9/2014 | Johnson | H04L 49/357 370/401 |
| 2016/0091685 A1* | 3/2016 | Raza | H04Q 11/0066 398/19 |
| 2016/0210261 A1* | 7/2016 | Oprea | G06F 13/4282 |
| 2016/0373334 A1* | 12/2016 | Gintis | H04L 43/50 |
| 2018/0077472 A1* | 3/2018 | Raza | G02B 6/4292 |

* cited by examiner

- Nodes 1, 6, 11 and 16 are ports on the same gateway device
- Node 5 sends broadcast packet
- Nodes 1, 6, 11 and 16 receive broadcast packet
- Gateway determines that nodes 1 and 6 are the closest nodes to node 5
- Gateway chooses node 1 as optimum node
- Node 1 is associated with this traffic and will handle future traffic related to the broadcast packet

DEDICATED NETWORK GATEWAY DEVICE

RELATED APPLICATIONS

This application is a continuation application of and claims priority under 35 U.S.C. § 120 of U.S. patent application Ser. No. 16/754,339 filed on Apr. 7, 2020 and titled DIRECT INTERCONNECT GATEWAY, which, in turn, claims priority under 35 U.S.C. § 120 of PCT Patent Application Serial No. PCT/IB2018/057945 filed on Oct. 12, 2018 and titled DIRECT INTERCONNECT GATEWAY. The contents of these applications are incorporated herein by reference.

FIELD OF THE INVENTION

The present invention relates to I/O (Input/Output) traffic in a computer network. More specifically, the present invention relates to a dedicated device that bridges, switches or routes data between traditional networks and direct interconnect networks.

BACKGROUND OF THE INVENTION

Computer networks allow a multitude of nodes to route or otherwise exchange data with each other. As a result, computer networks are able to support an immense number of applications and services such as the shared use of storage servers, access to the World Wide Web, use of email, etc.

Nodes themselves can often be characterized into three types based on the specialized tasks that they perform: computation nodes, such as servers having CPUs that perform calculations (but that generally have little to no local disk space); I/O nodes that contain the system's secondary storage and provide parallel file-system services; and gateway nodes that provide connectivity to external data servers and mass storage systems. Some nodes can even serve more than one function, such as, for instance, handling both I/O and gateway functions.

I/O for parallel and distributed systems, however, has become a huge concern for both users and designers of computer systems. In this respect, while the speeds of CPUs have been increasing at an exponential rate virtually every year, the speed of I/O devices has unfortunately increased at a slower pace, often due to the fact that they can be more limited by the speed of mechanical components. I/O performance, a measure of I/O data traffic between nodes, is therefore often a limiting factor in network performance. Indeed, the mismatch in speed between CPUs and VO is accentuated in parallel and distributed computer systems, leaving I/O as a bottleneck that can severely limit scalability. This is especially the case when the network is involved with commercial applications involving multimedia and scientific modelling, for instance, each of which has huge I/O requirements.

Direct interconnect networks, such as those disclosed in PCT Patent Application Publication No. WO 2015/027320 A1 (which describes a novel torus or higher radix interconnect topology for connecting network nodes in a mesh-like manner in parallel computer systems), generally restrict traffic to nodes that are part of the direct interconnect. While the novel system and architecture disclosed in PCT Patent Application Publication No. WO 2015/027320 A1 is particularly beneficial and practical for commercial deployment in data centers and cloud data centers, most data centers in operation today are still based, unfortunately, on a traditional legacy three-tier architecture, a fat tree architecture, or a DCell server-centric architecture, among others. With data centers based on these architectures, it is unfortunately either undesirable or impossible for them to join a direct interconnect, and they are therefore unable to exploit the benefits of such a network topology. Some prior art direct interconnect architectures have provided a system wherein each node, or a subset of nodes (i.e. gateway nodes), have dual connectivity, both to the direct interconnect and to the traditional network, but such nodes are difficult to manage and load the resources of the device as they bridge or route between the two networks.

It would therefore be desirable to have a direct interconnect gateway that is designed and capable of allowing direct interconnect devices and non-direct interconnect devices to communicate. Moreover, it would be beneficial to have a gateway that could assist in overcoming some of the shortcomings described above for I/O traffic.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, one embodiment of the present invention provides for a dedicated network gateway device capable of bridging, switching or routing network traffic between a traditional network and a direct interconnect network is provided. The device may include a host interface card having a first port, second port, and at least one computation device. The first port may be a direct interconnect port connected to a direct interconnect network. The second port may be a traditional network port connected to switches and devices in the traditional network. The computation device may be internally connected to the first and second ports. The host interface card may be connected to a host device via a communication bus and may be capable of switching network traffic between the traditional and direct interconnect networks without intervention by the host device.

The computation device may include a direct interconnect device that may be internally connected to the first port. The computation device may also include a network controller device that may be internally connected to the second port. The network controller device may be internally connected to the direct interconnect device.

The direct interconnect device may be either an application specific integrated circuit (ASIC), field-programmable gate array (FPGA), general purpose processor, network processor, or a network traffic forwarding device. The network controller device may be either an application specific integrated circuit (ASIC), field-programmable gate array (FPGA), general purpose processor, network processor, or a network traffic forwarding device. The network controller device may also be capable of switching network traffic between the traditional network and the direct interconnect network without intervention by the host device.

The computation device may also be a direct interconnect and traditional device that may be internally connected to each of the first and second ports. The direct interconnect and traditional device may include either an application specific integrated circuit (ASIC), field-programmable gate array (FPGA), general purpose processor, network processor, or a network traffic forwarding device. The direct interconnect and traditional device may be capable of switching network traffic between the traditional network and the direct interconnect network without intervention by the host device.

The second port may be connected to switch and/or router ports in the traditional network. The second port may be connected to the traditional network via at a traditional network switch application-specific integrated circuit (ASIC), a network controller ASIC, a field-programmable gate array (FPGA), a general-purpose processor, a network processor, and/or a network traffic forwarding device. The first port may be connected to the direct interconnect network via a dedicated interconnect application-specific integrated circuit (ASIC), a field-programmable gate array (FPGA), a general-purpose processor, network processor, a passive patch panel/hub, and/or a network traffic forwarding device.

The network traffic forwarding device may be capable of acting as a direct interconnect node with locally destined/sourced traffic sent over a traditional network interface. The first port may take the place of a device within the direct interconnect network. The first port may further include a plurality of links that may be connected to a respective plurality of nodes/devices within the direct interconnect network.

In another embodiment, the present invention may include a dedicated network gateway device that may be capable of bridging, switching and/or routing network traffic between a traditional network and a direct interconnect network. The dedicated network gateway device may include a host interface card having a first port that may be a direct interconnect port that may be configured to be connected to the direct interconnect network, and a direct interconnect application-specific integrated circuit (ASIC) internally connected to the first port.

The host interface card may further include a second port that may be a traditional network port that may be configured to be connected to at least one of switches and devices that form the traditional network. the host interface card may yet further include a network controller application specific integrated circuit (ASIC) that may be internally connected to each of the second port and to the direct interconnect ASIC.

The dedicated network gateway device may be capable of bridging, switching or routing network traffic between the traditional network and the direct interconnect network. The host interface card may be adapted to be connected to a host device via a communication bus. The network controller ASIC may be operable to switch network traffic between the traditional network and the direct interconnect network without intervention by the host device.

The second port may be connected to switch and/or router ports in the traditional network. The second port may also be connected to the traditional network via a traditional network switch application-specific integrated circuit (ASIC), a network controller ASIC, a field-programmable gate array (FPGA), a general-purpose processor, a network processor, and/or a network traffic forwarding device. The first port may be connected to the direct interconnect network via a dedicated interconnect application-specific integrated circuit (ASIC), a field-programmable gate array (FPGA), a general-purpose processor, a network processor, a passive patch panel/hub, and/or a network traffic forwarding device.

The network traffic forwarding device may be capable of acting as a direct interconnect node with locally destined/sourced traffic sent over a traditional network interface. The first port may further include a plurality of links that may be connected to a respective plurality of nodes/devices within the direct interconnect network.

In yet another embodiment, the present invention may include a dedicated network gateway device that may be capable of bridging, switching and/or routing network traffic between a traditional network and a direct interconnect network. The dedicated network gateway device may include a host interface card having a first port that may be a direct interconnect port that may be configured to be connected to the direct interconnect network and a second port that may be a traditional network port that may be configured to be connected to switches and/or devices that form the traditional network.

The first port and the second port may be internally connected to a direct interconnect and traditional application specific integrated circuit (ASIC). The dedicated network gateway device may be capable of bridging, switching and/or routing network traffic between the traditional network and the direct interconnect network. The host interface card may be adapted to be connected to a host device via a communication bus. The direct interconnect and traditional ASIC may be operable to switch network traffic between the traditional network and the direct interconnect network without intervention by the host device.

The second port may be connected to switch and/or router ports in the traditional network. The second port may be connected to the traditional network via a traditional network switch application-specific integrated circuit (ASIC), a network controller ASIC, a field-programmable gate array (FPGA), a general purpose processor, a network processor, and/or a network traffic forwarding device. The first port may be connected to the direct interconnect network via a dedicated interconnect application-specific integrated circuit (ASIC), a field-programmable gate array (FPGA), a general purpose processor, a network processor, a passive patch panel/hub, and/or a network traffic forwarding device.

The network traffic forwarding device may be capable of acting as a direct interconnect node with locally destined/sourced traffic sent over a traditional network interface. The first port may take the place of a device within the direct interconnect network.

In yet another embodiment, the present invention may include a dedicated network gateway device for bridging and/or routing network traffic between a traditional network and a direct interconnect network. The dedicated network gateway device may include a first set of traditional network ports with a single link per port, with such ports being connected to end devices that form a first traditional network, and a second set of direct interconnect ports with two or more links per port, with such ports being connected to the direct interconnect network.

The direct interconnect network may act as a backbone that may allow network traffic to route from the dedicated network gateway device to one or more other dedicated network gateway devices. The dedicated network gateway device and the one or more other dedicated network gateway devices may be defined as a plurality of gateway devices.

The one or more other dedicated network gateway devices may include a first set of traditional network ports with a single link per port, with such ports being connected to end devices that form a second traditional network, and a second set of direct interconnect ports with two or more links per port, with such ports being connected to the direct interconnect network. The plurality of gateway devices may include a coordination function that may assign one or more direct interconnect nodes within the direct interconnect network to each of the at least one direct interconnect ports so only one of the direct interconnect ports processes the network traffic for a given flow.

The coordination function may further include an efficiency function that may regulate the direct interconnect ports so that the direct interconnect port that first receives network traffic for a given flow, which was destined for a different direct interconnect port on the same dedicated network gateway device, will process the network traffic for the given flow rather than forwarding the network traffic to the originally destined direct interconnect port. The dedicated network gateway devices may further have one or more direct interconnect computation devices that may be internally connected to the direct interconnect ports of the gateway device, and a switch computation device that may be internally connected to the traditional ports of the gateway device. The switch computation device may be internally connected to the direct interconnect computation devices.

The gateway devices may yet further include a coordination device that may be in communication with the direct interconnect computation devices via a coordination hub. The coordination hub may be configured facilitate communication of coordination information and decisions. The coordination function may be centralized on the coordination device.

The first set of traditional ports may be connected to the traditional network via a traditional network switch application-specific integrated circuit (ASIC), a network controller ASIC, a field-programmable gate array (FPGA), a general purpose processor, a network processor, and/or a network traffic forwarding device. The first set of traditional ports may be connected to switch and/or router ports in the traditional network.

The second set of direct interconnect ports may be connected to the direct interconnect network via a dedicated interconnect application-specific integrated circuit (ASIC), a field-programmable gate array (FPGA), a general purpose processor, a network processor, a passive patch panel/hub, and/or a network traffic forwarding device. The network traffic forwarding device may be capable of acting as a direct interconnect node with locally destined/sourced traffic sent over a traditional network interface.

In yet another embodiment, the present invention may include a dedicated network gateway device for bridging, switching and/or routing network traffic between a traditional network and a direct interconnect network. The dedicated network gateway device may include a first set of one or more traditional network ports with a single link per port, said first set of ports may be connected to at least one of switches and devices that form the traditional network.

The dedicated network gateway device may further include a second set of one or more direct interconnect ports with one or more links per port, said second set of ports may be connected to the direct interconnect network. The dedicated network gateway device may yet further include a plurality of direct interconnect ports that may be logically associated by the gateway device to act as a single direct interconnect node. The gateway device may include one or more direct interconnect computation devices that may be internally connected to one or more of the plurality of logically associated direct interconnect ports.

The gateway device may further include a switch computation device that may be internally connected to each of the one or more direct interconnect devices and to the first set of traditional network ports. The gateway device may yet further include a coordination bus that may be internally connected to the respective amount of one or more direct interconnect computation devices. The coordination bus may be configured to facilitate communication of coordination information and decisions. The dedicated network gateway device may be capable of bridging, switching and/or routing network traffic between the traditional network and the direct interconnect network.

The gateway device may include a coordination function that may be distributed across the respective amount of direct interconnect computation devices and may assign one or more direct interconnect nodes within the direct interconnect network to each of the logically associated direct interconnect ports so that only one of the logically associated direct interconnect ports processes the network traffic for a given flow. The coordination function may be centralized in the one or more direct interconnect computation devices.

The gateway device may further include a coordination computation device that may be internally connected to the coordination bus. The coordination function may be centralized in the coordination computation device. The one or more direct interconnect computation devices may include a dedicated interconnect application-specific integrated circuit (ASIC), a field-programmable gate array (FPGA), a general purpose processor, a network processor, and/or a network traffic forwarding device.

The switch computation device may include a dedicated switch application-specific integrated circuit (ASIC), a field-programmable gate array (FPGA), a general purpose processor, a network processor, and/or a network traffic forwarding device. The first set of at least one traditional network ports may be connected to the traditional network via a traditional network switch application-specific integrated circuit (ASIC), a network controller ASIC, a field-programmable gate array (FPGA), a general purpose processor, a network processor, and/or a network traffic forwarding device.

The second set of one or more direct interconnect ports may be connected to the direct interconnect network via a dedicated interconnect application-specific integrated circuit (ASIC), a field-programmable gate array (FPGA), a general purpose processor, a network processor, a passive patch panel/hub, and/or a network traffic forwarding device. The coordination function may include an efficiency function that may regulate the direct interconnect ports so that the direct interconnect port that first receives network traffic for a given flow, which was destined for a different direct interconnect port on the same dedicated network gateway device, will process the network traffic for the given flow rather than forwarding the network traffic to the originally destined direct interconnect port.

BRIEF DESCRIPTION OF THE DRAWINGS

Some embodiments of the present invention are illustrated as an example and are not limited by the figures of the accompanying drawings, in which like references may indicate similar elements.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

The present invention provides for a dedicated device, namely a gateway device, that is capable of bridging, switching or routing between traditional and direct interconnect networks. By employing such a dedicated device, the resources on the direct interconnect nodes do not have to be burdened by bridging, switching or routing between a direct interconnect and traditional network, thereby minimizing impacts on I/O performance. In addition, as opposed to the prior art use of gateway nodes, the present gateway device is a highly manageable device that can be managed by network management systems. Moreover, the gateway device of the present invention allows for the coordination of MAC tables and ARP, broadcast, multicast and anycast responses between multiple direct interconnect ports.

Figure 1:
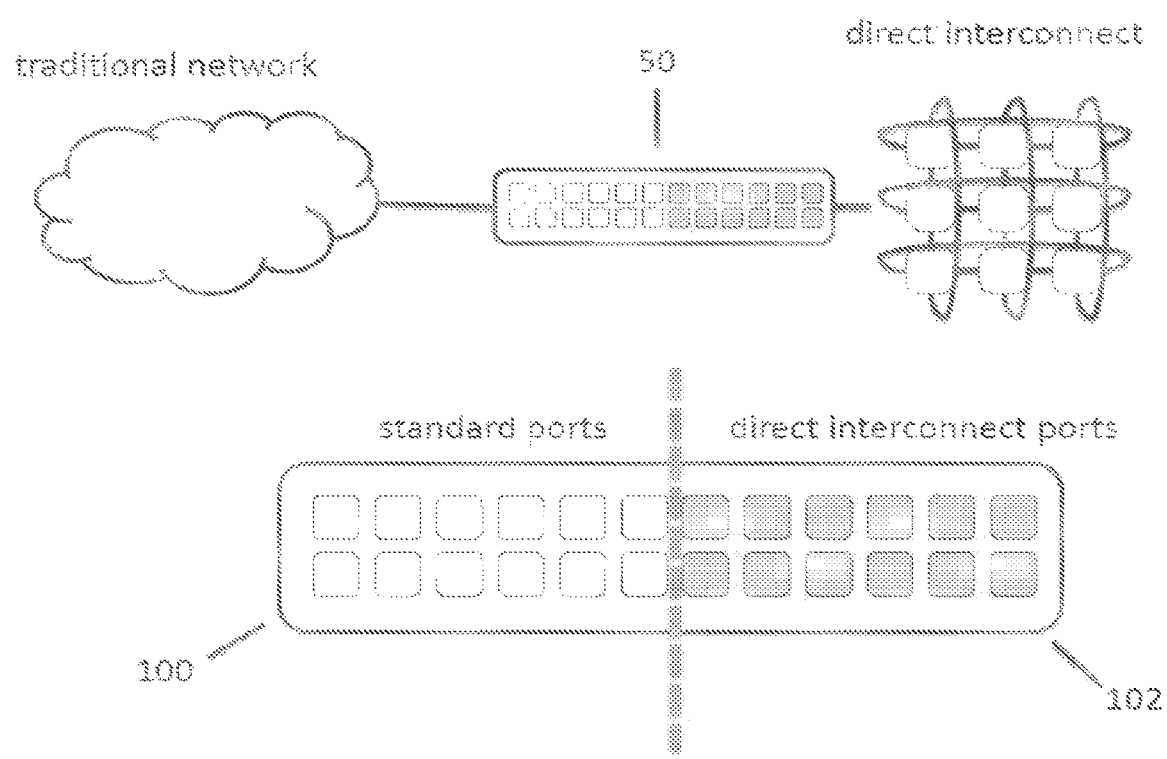
FIG. 1 is a schematic representation of a gateway device according to an embodiment of the present invention.
Figure 2:
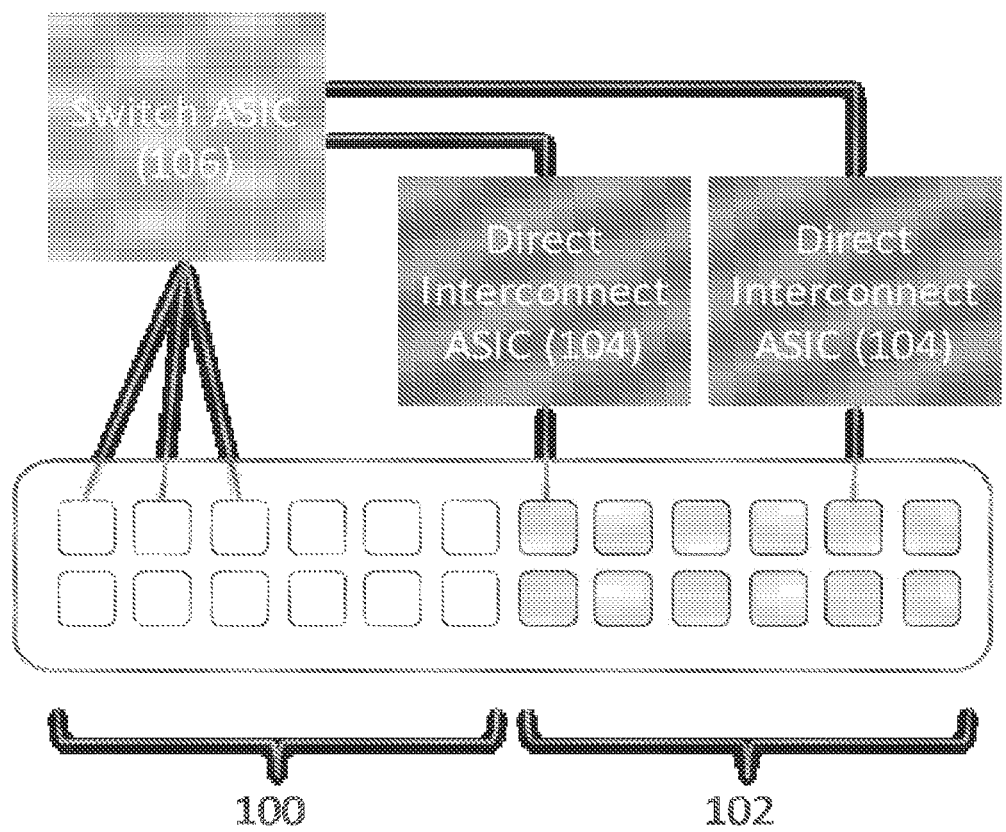
FIG. 2 is a schematic representation of a gateway device according to an embodiment of the present invention, comprising a traditional network switch ASIC with certain ports connected to traditional network connectors and other ports connected to their own dedicated direct interconnect ASIC.
Figure 3:
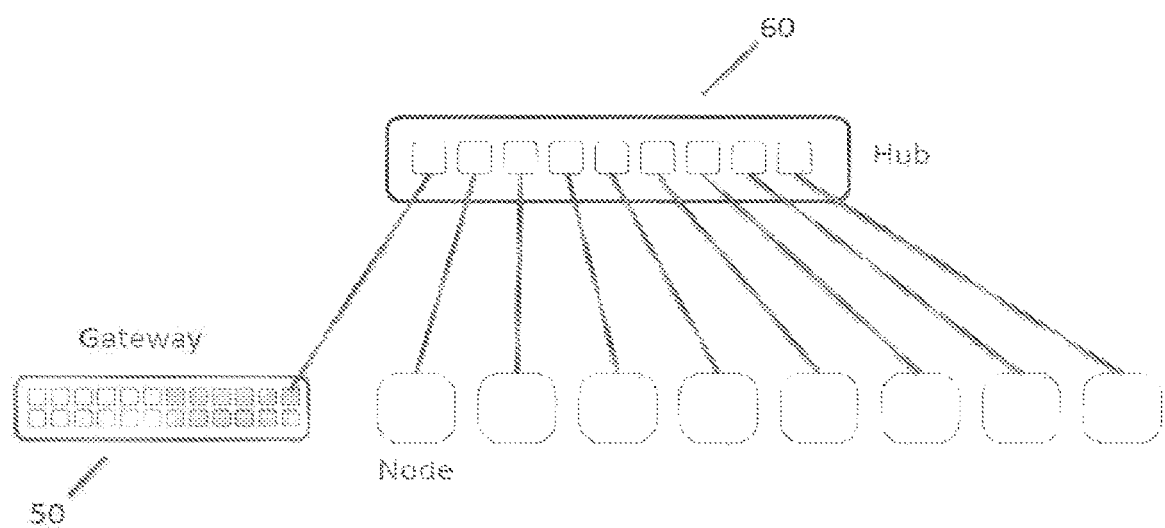
FIG. 3 is a schematic representation of a gateway device according to an embodiment of the present invention with the direct interconnect ports connected to a passive patch panel/hub.

FIG. 1 shows a high-level overview of a gateway device 50 in accordance with one embodiment of the present invention, comprising two sets of ports. The first set of ports (in this example, the left-most twelve ports) are standard, traditional network ports 100 with a single link per port (e.g. SFP+, QSFP, QSFP+ connectors) that are connected to the existing switches and/or devices that form the traditional network. In a Clos topology (a multi-stage circuit switching network), for example, these ports 100 would most likely be connected to spine or super-spine ports. The second set of ports (the right-most twelve ports) are direct interconnect ports 102 with a high number of links (two or more) per port (e.g. with MXC/MTP/MTO connectors). If a passive patch panel/hub 60 similar to that disclosed in PCT Patent Application Publication No. WO 2015/027320 A1 is being used to support the direct interconnect topology, for example, then the direct interconnect ports 102 are connected to the passive patch panel/hub 60 (see FIG. 3). The gateway device 50 may be in the form of a 1 rack unit (RU) rack-mountable device, or even ½ RU (or otherwise as desired) for efficient rack space savings. FIG. 2 shows an embodiment comprised of a traditional network switch application-specific integrated circuit (ASIC) 106, wherein the first set of traditional network ports 100 are each connected to traditional network connectors, and wherein the second set of direct interconnect ports 102 are each connected to their own dedicated direct interconnect ASIC 104. These dedicated direct interconnect ASICs 104 are preferably each capable of acting as a direct interconnect node with locally destined/sourced traffic sent over a traditional network interface line (e.g. 100 Gbps Ethernet). The connections between the ports of switch ASIC 106 and direct interconnect ASICs 104 can be implemented using any standard component interconnect such as 100 GBase-KR4, 100 GBase-KP4, 40 GBase-KR4, 25 GBase-KR, 10 GBase-KR or any other similar standard.

Traditional network switch ASIC 106 contains standard network traffic forwarding functionality, including learning the devices reachable through its ports, sending received traffic through the appropriate egress port, network filtering, traffic inspection and other functionality typically found in layer 2, layer 3 and layer 4 and above network switches, routers and bridges. Forwarding decisions may be based on one or more factors, including but not limited to source and destination layer 2 (MAC) addresses, source port, source and destination layer 3 (IPv4, IPv6, etc.) addresses, source and destination layer 4 ports, and layer 5 and above headers and data payloads.

Network traffic received from the direct interconnect at a direct interconnect ASIC 104 that has an ultimate destination that is reachable through the standard ports of switch ASIC 106 will be sent from direct interconnect ASIC 104 to switch ASIC 106 where switch ASIC 106 standard traffic forwarding functionality will transmit the traffic through the appropriate standard port.

Similarly, network traffic received by switch ASIC 106 from a standard port that has an ultimate destination that is reachable through a direct interconnect ASIC 104 will be forwarded by switch ASIC 106 to direct interconnect ASIC 104.

In another embodiment (not shown), and as applicable for every possible embodiment, it would be understood that switch ASIC 106 (and all similar ASICs discussed herein) may be replaced by a field-programmable gate array (FPGA), general purpose processor, network processor or any other device capable of performing network traffic forwarding.

In another embodiment (not shown), and as applicable for every possible embodiment, it would be understood that direct interconnect ASIC 104 (and all similar ASICs discussed herein) may be replaced by a field-programmable gate array (FPGA), general purpose processor, network processor or any other device capable of acting as a node in a direct interconnect network.

Figure 2B:
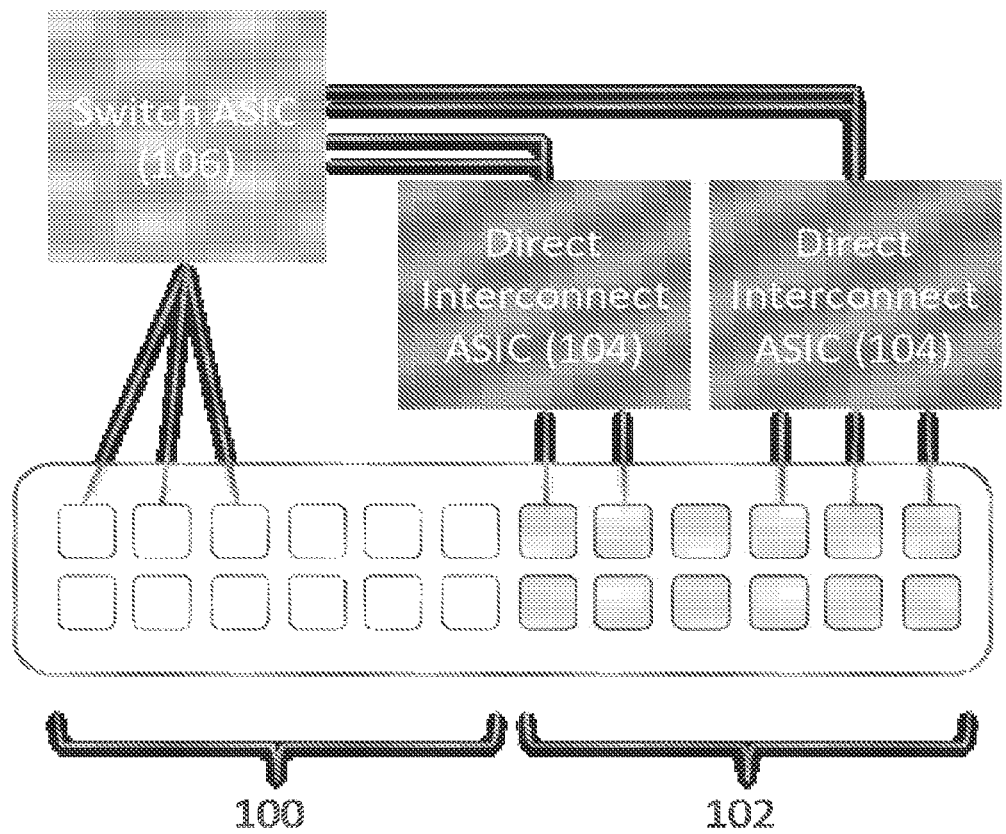
FIG. 2b is a schematic representation of the gateway device according to FIG. 2, with each direct interconnect ASIC connected to more than one direct interconnect port and connected to more than one traditional network switch ASIC port.

FIG. 2b shows another embodiment where each direct interconnect ASIC 104 can be connected to one or more direct interconnect ports 102 and can be connected to one or more traditional network switch ASIC 106 ports.

Figure 2C:
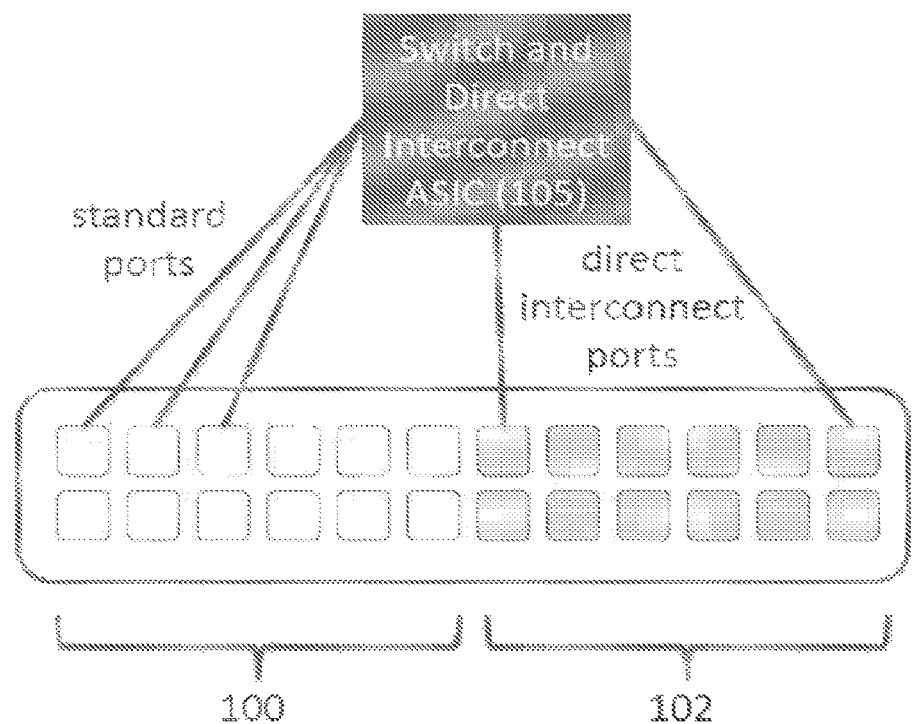
FIG. 2c is a schematic representation of a gateway device according to an embodiment of the present invention, comprising a switch and direct interconnect ASIC.

FIG. 2c shows another embodiment where a single switch and direct interconnect ASIC 105 combines the functions of the traditional network switch ASIC 106 and one or more direct interconnect ASICs 104. Once again, it would be understood that single switch and direct interconnect ASIC 105 (and all similar ASICs discussed herein) may be replaced by a field-programmable gate array (FPGA), general purpose processor, network processor or any other device capable of performing network traffic forwarding and/or acting as a node in a direct interconnect network.

Figure 2D:
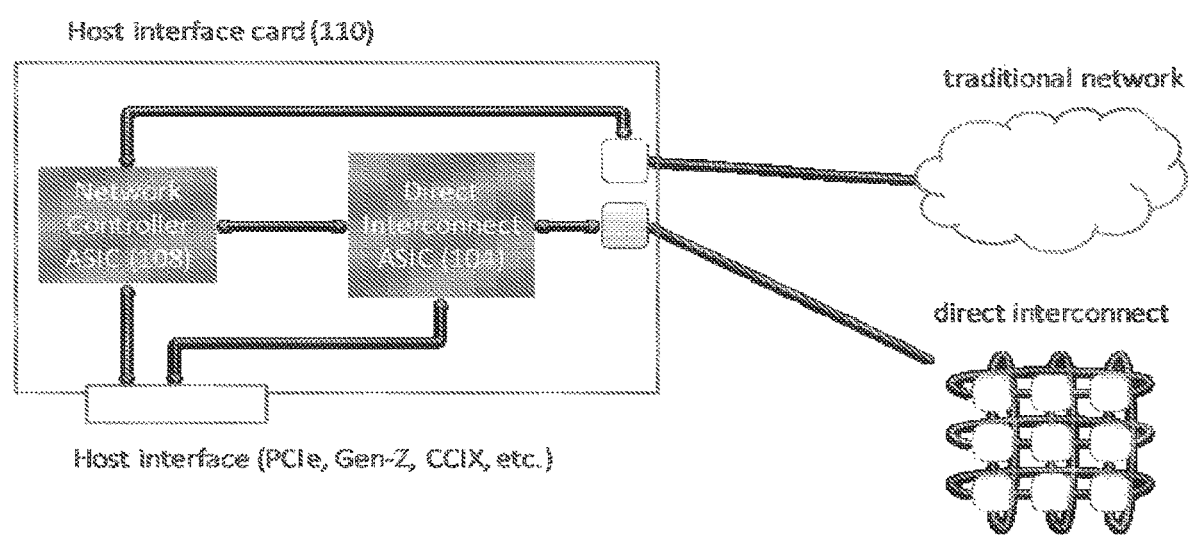
FIG. 2d is a schematic representation of a gateway device according to an embodiment of the present invention, comprising a host interface card.

FIG. 2d shows another embodiment of a gateway device in the form of a host interface card 110 containing a traditional network port and direct interconnect port. Host interface card 110 is designed to be connected to a host device via a communication bus such as PCIe, Gen-Z or CCIX. The host device could be a server, computer, hard drive, solid state drive, drive cabinet or any other device capable of sending and receiving data. The traditional network port is connected to standard network controller ASIC 108 (or similarly a field-programmable gate array (FPGA), general purpose processor, network processor or any other device capable of performing network traffic forwarding, etc.) and the direct interconnect port is connected to direct interconnect ASIC 104. Direct interconnect ASIC 104 is also connected to network controller ASIC 108. In this form, network controller ASIC 108 would be capable of switching traffic between the traditional network and direct interconnect network without intervention by the host.

Figure 2E:
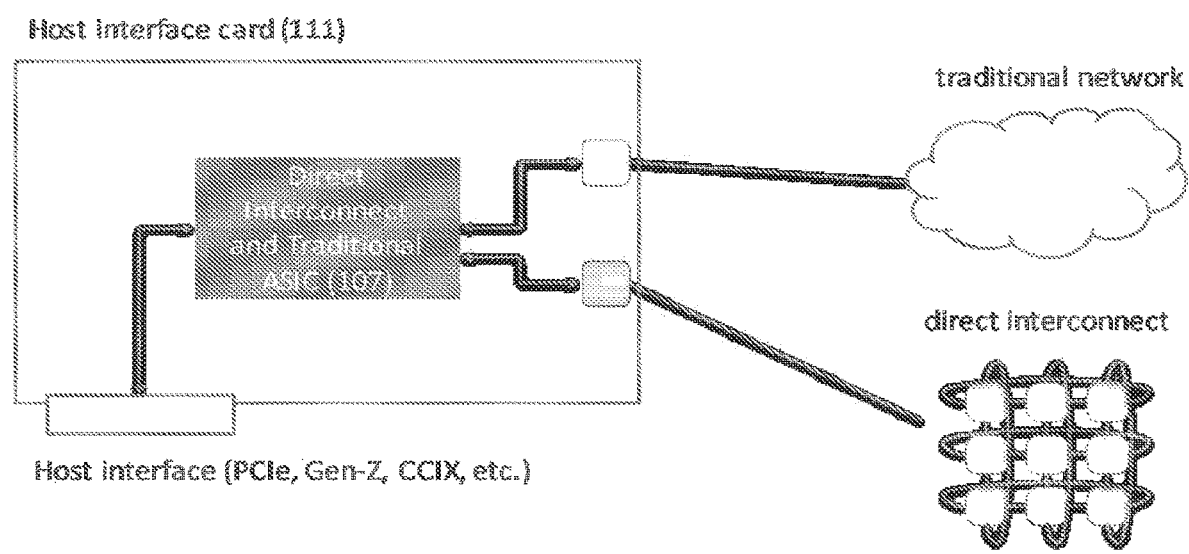
FIG. 2e is a schematic representation of a gateway device according to an embodiment of the present invention, comprising a host interface card having a single direct interconnect and traditional ASIC.

FIG. 2e shows an embodiment of another host interface card 111 where the functions of the direct interconnect ASIC 104 and network control ASIC 108 are combined into a single direct interconnect and traditional ASIC 107. Once again, it would be understood that single direct interconnect and traditional ASIC 107 (and all similar ASICs discussed herein) may be replaced by a field-programmable gate array (FPGA), general purpose processor, network processor or any other device capable of performing network traffic forwarding and/or acting as a node in a direct interconnect network.

Figure 2F:
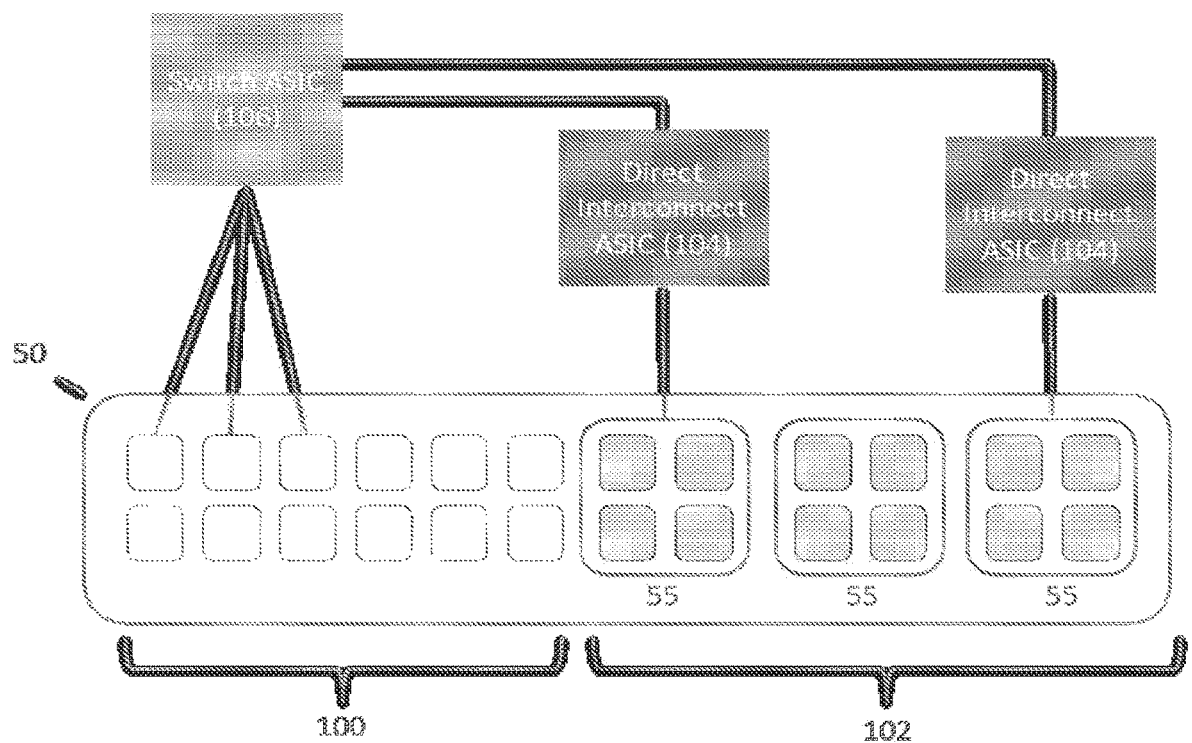
FIG. 2f is a schematic representation of a gateway device according to an embodiment of the present invention, with the direct interconnect ports containing one or more links per port and combined into groups by the gateway device, and with each group logically associated by the gateway device to act as a single node within the direct interconnect network.

FIG. 2f shows another embodiment where the direct interconnect ports 102 contain one or more links per port and are combined into groups 55 by the gateway device 50. Each group 55 is logically associated by the gateway device 50 to act as a single node within the direct interconnect network.

Figure 4:
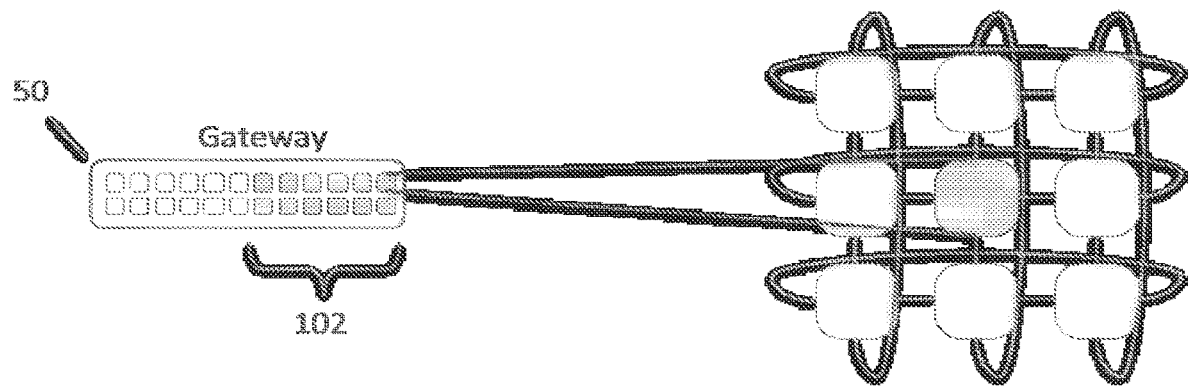
FIG. 4 is a schematic representation of a gateway device according to an embodiment of the present invention where a direct interconnect port replaces a server within a direct interconnect topology.

As shown in FIG. 4, the direct interconnect ports 102 and groups 55 would each take the place of a device within the direct interconnect topology.

Figure 4B:
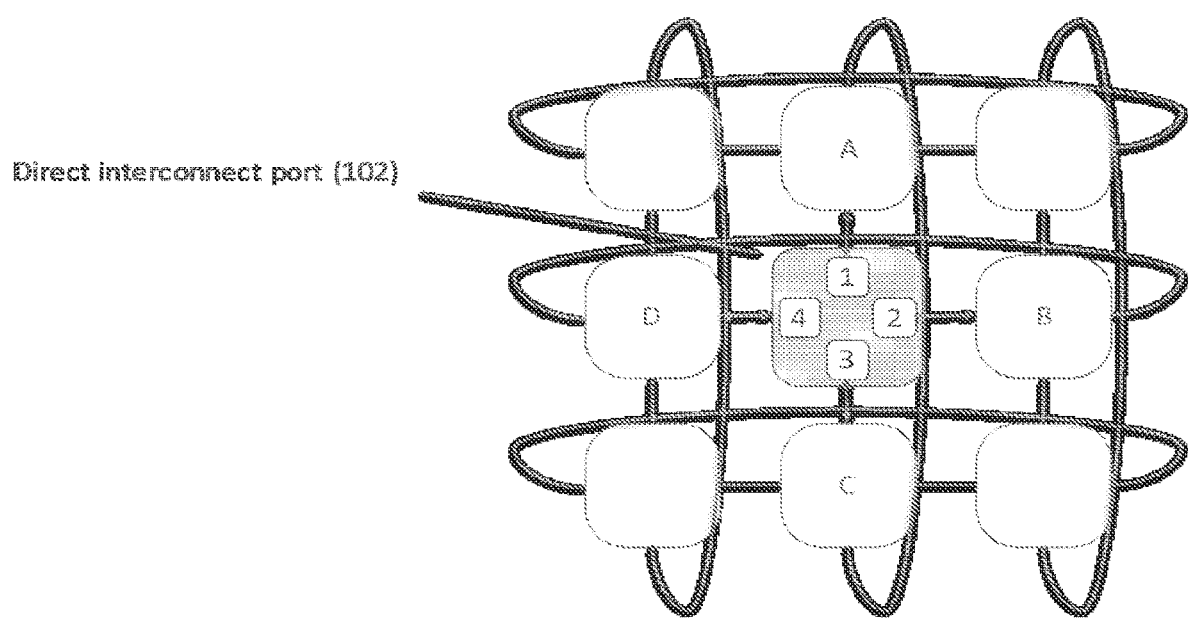
FIG. 4b is a schematic representation of the gateway device according to FIG. 4, with the links of the direct interconnect ports connected to different nodes.

In yet another embodiment, if a passive patch panel/hub 60 is not utilized in the direct interconnect, then the individual links of each gateway port (i.e. the direct interconnect ports 102) may be connected to devices that are part of the direct interconnect. In this respect, FIG. 4b shows an embodiment wherein the links of one of the direct interconnect ports 102 are individually connected to neighbor nodes within the direct interconnect network. In FIG. 4b, the direct interconnect takes the form of a two-dimensional torus and the 4 links that comprise the direct interconnect port 102 are numbered 1, 2, 3 and 4. In order to form the two-dimensional torus, link 1 is connected to device A, link 2 is connected to device B, link 3 is connected to device C and link 4 is connected to device D. Similarly, for other topologies, each link of the direct interconnect port 102 should be connected to the appropriate neighbor device required by that topology.

Figure 5:
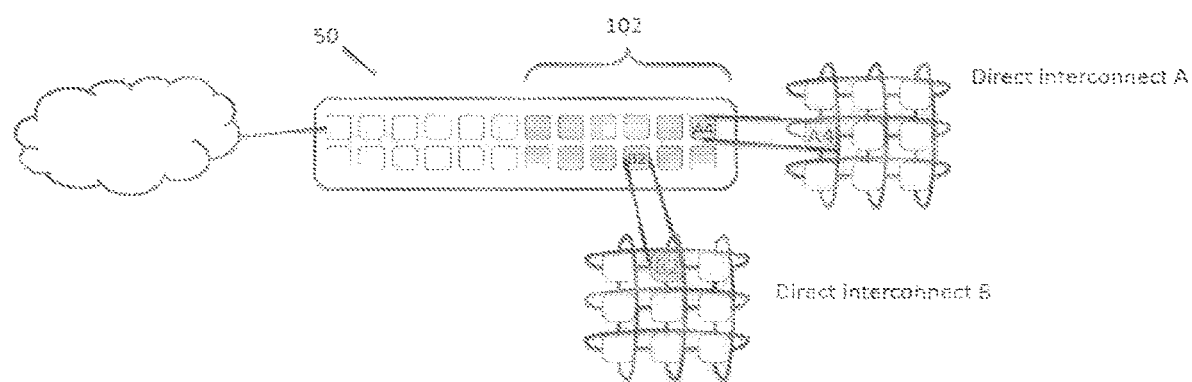
FIG. 5 is a schematic representation of a gateway device according to an embodiment of the present invention with the direct interconnect ports on the gateway linked to different direct interconnects to allow bridging, switching or routing between multiple direct interconnects.

In a further embodiment, as shown in FIG. 5, the gateway device 50 could also be used to bridge, switch or route between multiple direct interconnects. In this case, the direct interconnect ports 102 on the gateway device 50 will be divided between the different direct interconnects (shown in FIG. 5 as A and B). All of the devices in direct interconnect A would then be reachable from direct interconnect A through the gateway device 50 and vice versa. In the example provided, traffic from a device in Direct Interconnect A destined for a device in Direct Interconnect B would first traverse Direct Interconnect A to the direct interconnect port 102 shown as A4 on gateway device 50. Gateway device 50 would then forward this traffic through the direct interconnect port 102 shown as B2 where it would then be forwarded through Direct Interconnect B to the destination node.

Figure 6:
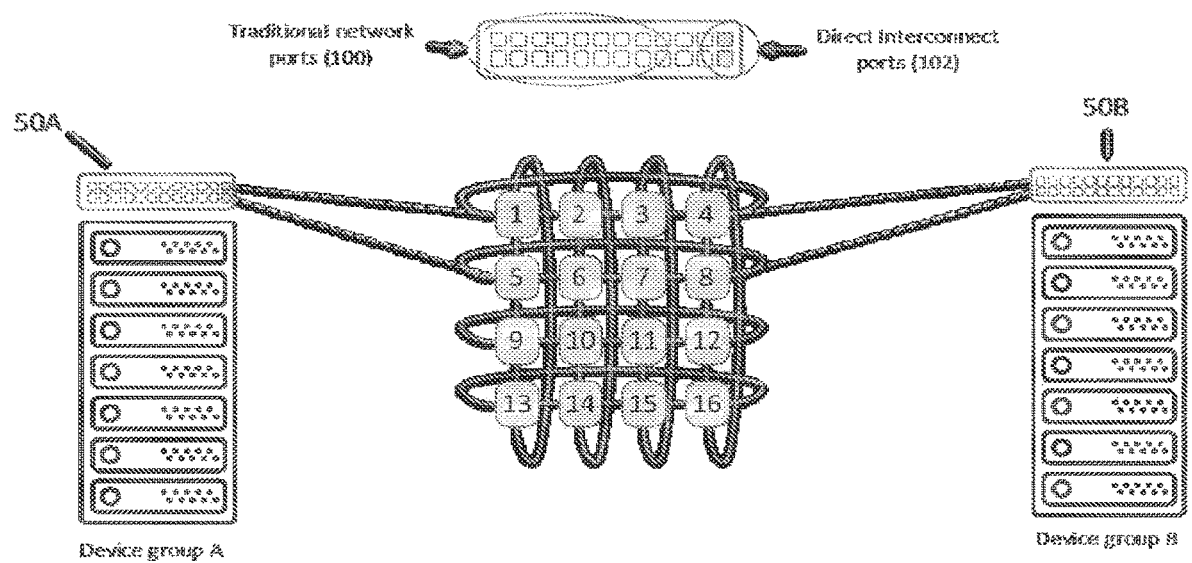
FIG. 6 is a schematic representation of an embodiment of the present invention with all or a majority of the nodes within the direct interconnect composed of gateway ports, and all or a majority of the other devices are connected directly to one or more gateways.

In yet another embodiment of the present invention, the gateways could be used as access switches and the direct interconnect would form the backbone (see FIG. 6). In this case, all or the majority of the nodes within the direct interconnect would be composed of gateway ports, and all or the majority of the other devices would be connected directly to the traditional network ports 100 of gateway device 50. In the example provided in FIG. 6, traffic from Device group A destined for Device group B would first be forward to gateway device 50A. The gateway 50A forwarding function would recognize that the destination device is reachable through the direct interconnect and would forward the traffic through one of gateway device 50A's direct interconnect ports 102. The direct interconnect would then forward the traffic to one of the direct interconnect ports of gateway device 50B. The gateway 50B forwarding function would recognize that the destination device is reachable through one of its standard network ports and would forward the traffic appropriately.

Figure 7:
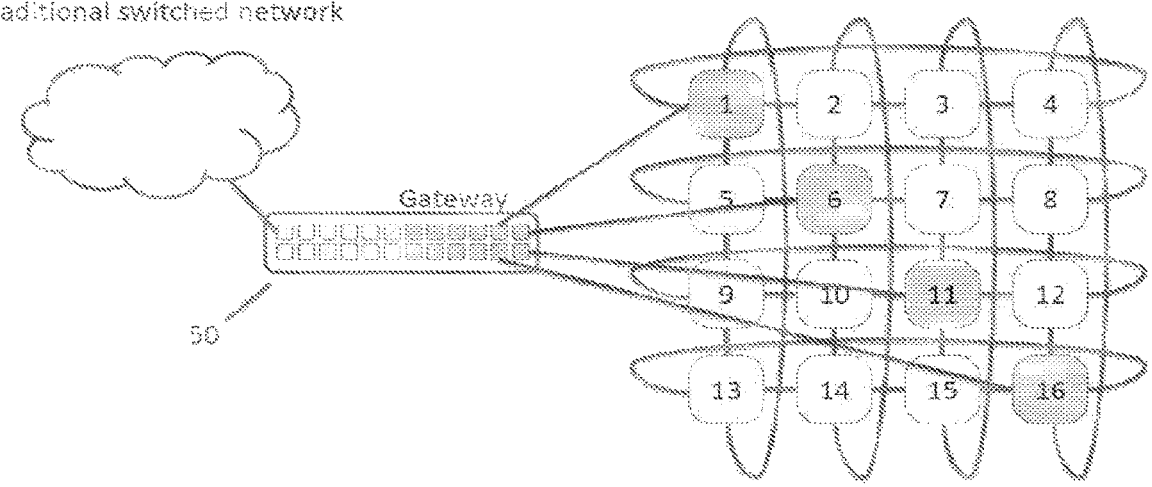
FIG. 7 is a schematic representation of a gateway device according to an embodiment of the present invention with the average distance (in hops) from each device in the direct interconnect to the nearest gateway port minimized.

In order to maximize I/O traffic efficiencies, FIG. 7 provides an example of how, in a single direct interconnect deployment, the direct interconnect ports 102 could be chosen to minimize the average distance (number of hops) from each gateway device 50 in the direct interconnect to the nearest gateway port. In a 4×4 2D torus with the nodes numbered as per FIG. 7, having the gateway act as nodes 1, 6, 11 and 16 would minimize the distance to the other nodes in the direct interconnect. However, a person skilled in the art would also understand that if a subset of the nodes tends to generate a higher amount of I/O than the average, then the deployment of the gateway nodes could be biased to be closer to these higher I/O nodes. Multiple algorithms are known that can be used to determine the optimum location for these I/O nodes (see, for instance, Bae, M., Bose, B.: "Resource Placement in Torus-Based Networks" in: Proc. IEEE International Parallel Processing Symposium, pp. 327-331. IEEE Computer Society Press, Los Alamitos (1996); Dillow: David A et al.: "I/O Congestion Avoidance via Routing and Object Placement" United States: N p, 2011. Print Proceedings of the Cray User Group conference (CUG 2011). Fairbanks, AK, USA; Almohammad, B., Bose, B.: "Resource Placements in 2D Tori" in: Proc. IPPS 1998 Proceedings of the 12$^{th}$ International Parallel Processing Symposium on International Parallel Processing Symposium, p. 431. IEEE Computer Society, Washington, DC (1998); Dillow, David A. et al.: "Enhancing I/O Throughput via Efficient Routing and Placement for Large-scale Parallel File Systems" in: Conference Proceedings of the IEEE International Performance, Computing, and Communications Conference (IPCCC), 2011 IEEE 30$^{th}$ International; Ezell, M. et al.: "I/O Router Placement and Fine-Grained Routing on Titan to Support Spider II" in: Proceedings of the Cray User Group Conference (CUG), May 2014; and Babatunde, A. et al.: "I/O Node Placement for Performance and Reliability in Torus Networks", Department of Computer Science, Texas A&M University, January 2006).

In a preferred embodiment, the direct interconnect ports 102 will act as standard direct interconnect ports and autonomously forward traffic remaining in the direct interconnect (i.e. forwarding FLITs). They will also recombine FLITs into network packets for traffic destined for devices not in the direct interconnect (see PCT Patent Application Publication No. WO 2015/120539 A1 for an optimal method to route packets in a distributed direct interconnect network). The gateway device 50 should preferably also have the capability to transmit/receive network packets to/from each of the traditional network ports 100 and direct interconnect ports 102, and also be able to interpret and forward this traffic based on layer 2, 3 or as per the above.

In a preferred embodiment, standard northbound network management interfaces would be exposed (e.g. CLI, OpenFlow, SNMP, REST, etc.) to allow a network management system to manage the gateway device 50.

In one embodiment, when multiple gateway ports are connected to the same direct interconnect, all packets from a given flow should preferably egress on the same gateway port to aid in guaranteeing in-order packet delivery.

The gateway device 50 should preferably be configured to aggregate MAC forwarding tables between the direct interconnect ports 102 connected to the same direct interconnect (i.e. when a direct interconnect port learns of a VLAN/MAC address/node_id tuple, this tuple should preferably be shared with the other direct interconnect ports 102 connected to the same direct interconnect).

Figure 8:
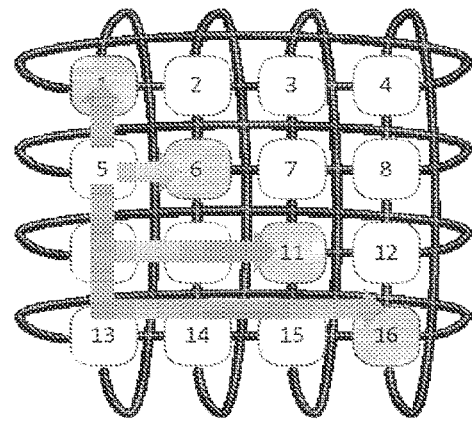
FIG. 8 is a schematic representation of a gateway device according to an embodiment of the present invention showing how the gateway may coordinate which direct interconnect port should respond to an ARP request received at more than one port in the same direct interconnect.
Figure 8B:
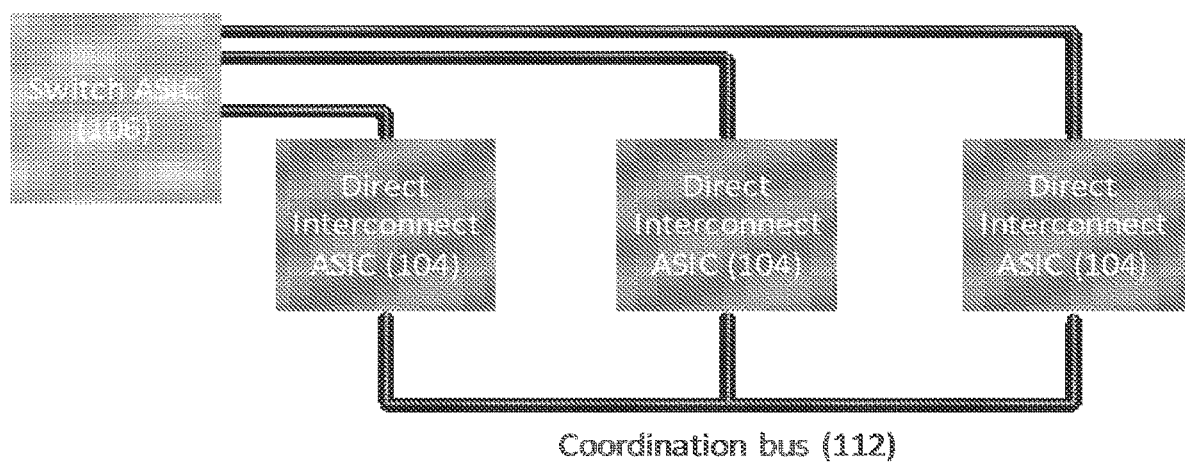
FIG. 8b is a schematic representation of a coordination mechanism according to an embodiment of the present invention with the coordination function distributed across the direct interconnect ASICs and with each direct interconnect ASIC connected to a coordination bus.

In a preferred embodiment, when an ARP request is received at one or more of the direct interconnect ports 102 connected to the same direct interconnect, the decision of which direct interconnect port should respond should be coordinated by the gateway 50 to ensure only a single response is transmitted (see e.g. at FIG. 8). This could be done, for example, by choosing the direct interconnect port closest to the source of the ARP request, the first direct interconnect port to receive the ARP, through a round-robin selection scheme, through a hash of some portion of the ARP request (IP address, source MAC, etc.), or another algorithm known to persons skilled in the art. FIG. 8b shows one embodiment of this coordination mechanism wherein the coordination function is distributed across the direct interconnect ASICs 104 and each direct interconnect ASIC 104 is connected to coordination bus 112 used to communicate coordination information and decisions. In another embodiment, this coordination function may be centralized in a dedicated coordination ASIC and each direct interconnect ASIC 104 is connected to the coordination ASIC via a dedicated or shared coordination bus 112.

Figure 9:
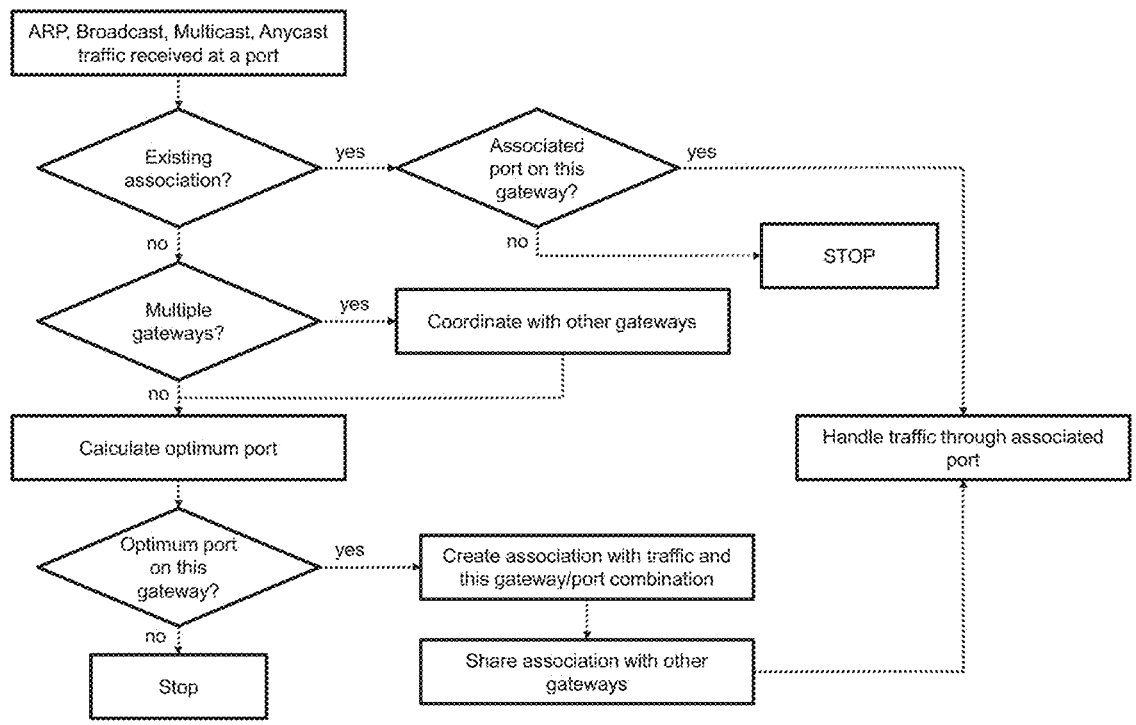
FIG. 9 is a flowchart showing how when more than one gateway is connected to the same torus, the gateways may coordinate their knowledge of the torus topology and response to ARP, broadcast, multicast and anycast traffic.

When more than one gateway is connected to the same torus, the gateway devices 50 should preferably coordinate their knowledge of the torus topology and response to ARP requests in a similar fashion to the single gateway case discussed above (see FIG. 9 for a logic tree re such coordination). In one embodiment, the gateways could discover each other through a broadcast protocol. In another embodiment, the gateways could be configured to know the location of the other gateways. In yet another embodiment, a consensus algorithm such as Raft could be used to ensure coordination of the gateways and consistency of the traffic—gateway/port associations (see e.g. Ongaro, D., Ousterhout, J.: "In Search of an Understandable Consensus Algorithm (Extended Version)" in: 2014 USENIX Annual Technical Conference, Jun. 19, 2014, Philadelphia, PA; Woos, D. et al.: "Planning for Change in a Formal Verification of the Raft Consensus Protocol" in: Certified Programs and Proofs (CPP), January 2016).

In general, whenever a torus node would like to communicate with a resource that is accessible through one or more gateway devices 50, the gateway(s) should preferably coordinate which gateway port is chosen to provide access to that resource in a similar manner to the ARP example described above. Examples of this include anycast, broadcast and multicast traffic, node and service discovery protocols and IPv6 neighbor discovery.

Figure 10:
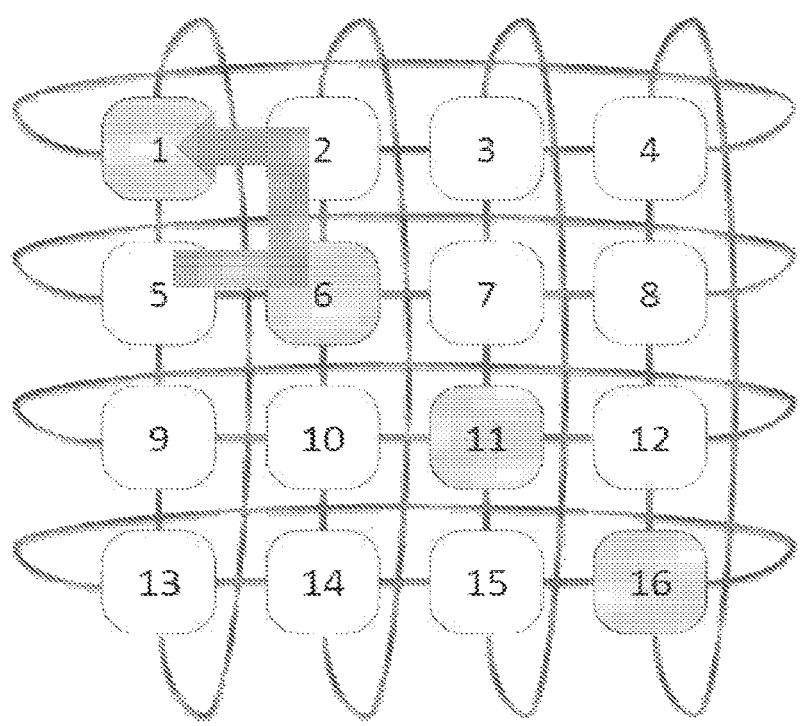
FIG. 10 is a schematic representation of a gateway node that may process a packet instead of routing the packet to another gateway node according to an embodiment of the present invention.

As a further consideration, it is important to note that, in many cases, non-minimal routing is used within a direct interconnect. Since the gateway(s) within a direct interconnect have gateway ports in multiple locations within the topology, it is possible for traffic destined for one gateway port to traverse one of the other gateway ports first. It would therefore be preferable to increase efficiencies by having a single, first gateway port process the traffic instead of allowing the traffic to traverse to a more distant gateway port. An example of this is provided in FIG. 10, where node 5 is sending traffic to node 1, but due to non-minimal routing, the packet will traverse node 6. In one embodiment, to improve efficiencies, the gateway with the port located at node 6 will recognize that the packet is destined for another gateway port and will process the packet as if it is destined for node 6 instead of forwarding it through the direct interconnect via node 2.

As noted above, the Direct Interconnect ASIC 104 provides connectivity between Switch ASIC 106 and a direct interconnect. In order to ensure that a person skilled in the art would be able to make and work a network gateway device of the present invention, FIGS. 11 and 12 describe the operation of a preferred embodiment of Direct Interconnect ASIC 104. This operation is also applicable, with any modifications as necessary, for other ASICs within the scope of this invention, including ASICs 105, 107 and 108, as appropriate.

Figure 11:
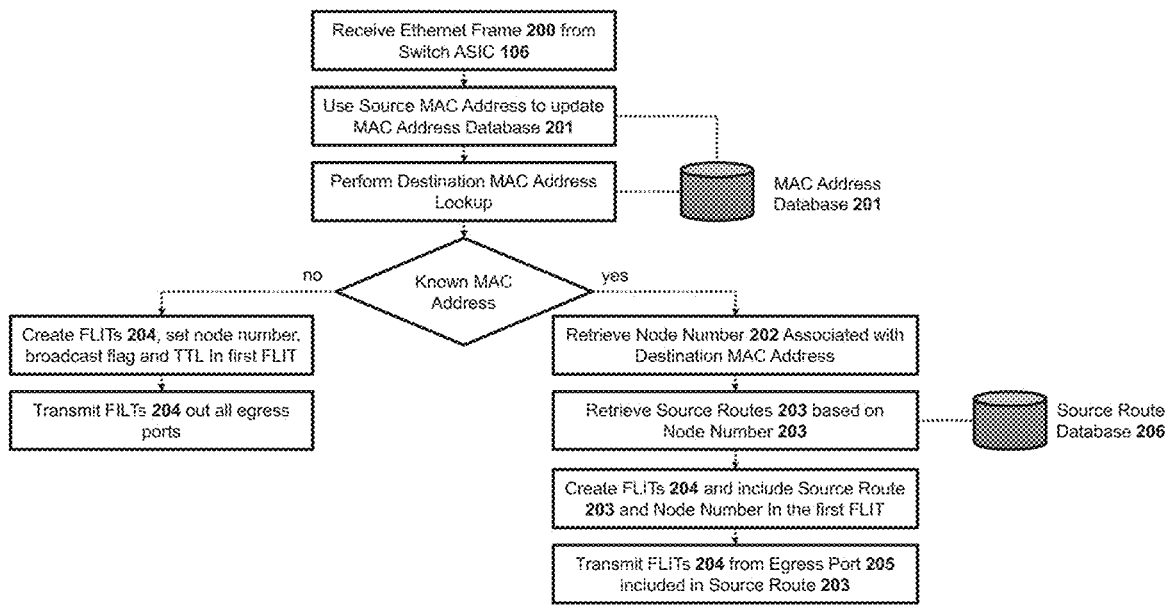
FIG. 11 is a flowchart describing an operation of a direct interconnect ASIC according to an embodiment of the present invention.

As is well-known in the art, Switch ASIC 106 transmits and receives Ethernet frames. FIG. 11 describes how Ethernet Frame 200 is processed by Direct Interconnect ASIC 104. MAC Address Database 201 contains a list of Ethernet MAC addresses and the direct interconnect nodes associated with each Ethernet MAC address. The Ethernet Frame 200 received from Switch ASIC 106 is examined and the Source and Destination MAC addresses are retrieved from its header. These MAC Addresses are used as indices to MAC Address Database 201. The source MAC address of the Ethernet Frame 301 is combined with the node number of the current to create or update an association between this node number and source MAC address in MAC Address Database 201.

If the Destination MAC address of Ethernet Frame 200 is in MAC Address Database 201, then the Node Number 202 associated with this MAC Address is retrieved from Mac Address Database 201. The Node Number 202 is then used as an index into Source Route Database 206 and source route 203 associated with Node Number 202 is retrieved from the Source Route Database 206. Ethernet Frame 200 is then converted into FLITs 204. A FLIT is a specialized frame type used in direct interconnects and can be of either fixed or variable size. In a preferred embodiment, FLITs will be of a fixed size. In other embodiment, FLITs will be of a variable size within a minimum and maximum size. In yet another embodiment, FLITs will be sized so that the Ethernet Frame 200 exactly fits into the FLIT payload.

If the Ethernet Frame 200 is larger than the payload of a single FLIT, multiple FLITs 204 will be created. If the Ethernet Frame 200 fits into the payload of a single FLIT, then a single FLIT will be created. Source Route 203 is then inserted into the header of the first of the FLITs 204 along with the node number of the current node. FLITs 204 are then transmitted from the Egress Port 205 specified in Source Route 203.

If the Destination MAC address of Ethernet Frame 200 is not in MAC Address Database 201 or if the Destination MAC Address of Ethernet Frame 200 indicates that it is a broadcast Ethernet packet, then Ethernet Frame 200 is converted into FLITs 204 as in the case described above although a source route will not be included. Once FLITs 204 have been created, a flag in the header of the first FLIT is set to indicate that these FLITs should be broadcast to every node in the direct interconnect. A time-to-live (TTL) value is also set in the header of the first FLIT. The TTL determines the maximum number of times broadcast FLITs can be forwarded through the direct interconnect. In one embodiment, anycast and multicast Ethernet frames are treated as if they are broadcast frames, as above.

Figure 12:
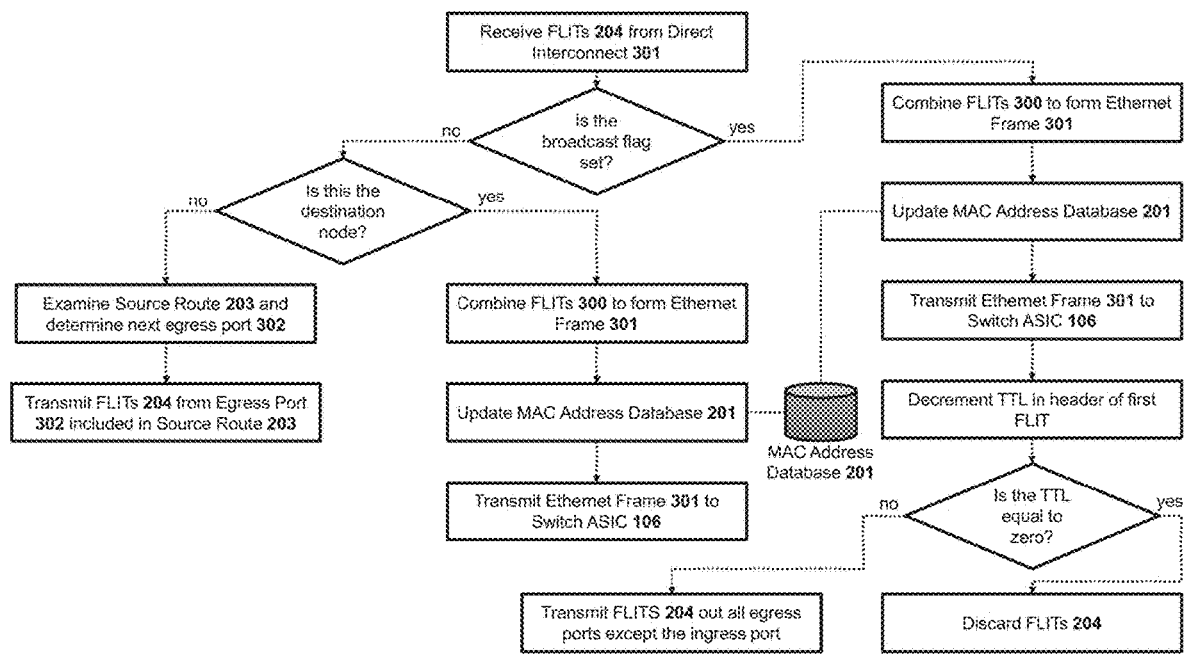
FIG. 12 is another flowchart describing another operation of a direct interconnect ASIC according to an embodiment of the present invention.

FIG. 12 describes how FLITs 204 are processed by Direct Interconnect ASIC 104 in a preferred embodiment of Direct Interconnect ASIC 104. FLITs 204 are received by Direct Interconnect ASIC 104 and the header of the first of these FLITs is examined to see if the broadcast flag is set. If the broadcast flag is not set, Source Route 203 is retrieved from the first FLIT and it is determined whether the source route indicates that the current node is the destination node for the FLITs 204. In another embodiment, the FLITs contain the node number of the destination node and it is the node number that is used to determine if the current node is the destination node for the FLITs 204. If the current node is the destination node for the FLITs 204, the FLITs 204 are combined to form Ethernet Frame 301. The source MAC address of the Ethernet Frame 301 is combined with the node number in the header of the first FLIT to create or update an association between said node number and source MAC address in MAC Address Database 201. Ethernet frame 301 is then transmitted to Switch ASIC 106.

If it is determined that this is not the destination node, the source route is used to determine the egress port 302 for FLITs 204. FLITs 204 are then transmitted out the egress port 302.

If the broadcast flag is set in the first FLIT header, the FLITs 204 are combined to form Ethernet Frame 301. The source MAC address of the Ethernet Frame 301 is combined with the node number in the header of the first FLIT to create or update an association between said node number and source MAC address in MAC Address Database 301. Ethernet Frame 301 is transmitted to Switch ASIC 106.

The TTL in the header of the first FLIT is then decremented by one. If the TTL is now equal to zero, then FLITs 204 are discarded. If the TTL is greater than zero, the FLITs 204 are transmitted out all egress ports except for the ingress port from which FLITs 204 were originally received.

In other embodiments of Direct Interconnect ASIC 104, source routing may not be used. In one embodiment, the destination MAC address of Ethernet Frame 200 will be used by each node to perform a local next-hop route lookup. In another embodiment, destination node information in the FLIT header will be used by each node to perform a local next-hop route lookup.

It will be obvious to those well-versed in the art that other embodiments of Direct Interconnect 104 and Switch ASIC 106 may be designed to work with protocols other than Ethernet. In one embodiment, these elements will be designed to work with Gen-Z. In this case, Direct Interconnect 104 would expect to received Gen-Z Core64 packets instead of Ethernet frames. Instead of Ethernet MAC addresses, Gen-Z GCIDs (Global Component IDs) would be used and associated with direct interconnect node numbers.

Although specific embodiments of the invention have been described, it will be apparent to one skilled in the art that variations and modifications to the embodiments may be made within the scope of the following claims.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

The claims in the instant application are different than those of the parent application or other related applications. Applicant therefore rescinds any disclaimer of claim scope made in the parent application or any predecessor application in relation to the instant application. Any such previous disclaimer and the cited references that it was made to avoid, may need to be revisited. Further, any disclaimer made in the instant application should not be read into or against the parent application.

The invention claimed is:

1. A dedicated network gateway device capable of at least one of bridging, switching and routing network traffic between a traditional network and a direct interconnect network comprising:
   a host interface card comprising:
      a first port that is a direct interconnect port configured to be connected to the direct interconnect network;
      a second port that is a traditional network port configured to be connected to at least one of switches and devices that form the traditional network; and
      at least one computation device internally connected to at least one of the first port and the second port;
   wherein the dedicated network gateway device is capable of bridging, switching or routing network traffic between the traditional network and the direct interconnect network;
   wherein the host interface card is adapted to be connected to a host device via a communication bus;
   wherein the at least one computation device is capable of switching network traffic between the traditional network and the direct interconnect network without intervention by the host device; and
   wherein the first port is configured to be connected to the direct interconnect network via a network traffic forwarding device that is capable of acting as a direct interconnect node with locally destined/sourced traffic sent over a traditional network interface.

2. The dedicated network gateway device according to claim 1 wherein the at least one computation device comprises:
   a direct interconnect device that is internally connected to the first port; and
   a network controller device that is internally connected to the second port and internally connected to the direct interconnect device;
   wherein the direct interconnect device comprises at least one of an application specific integrated circuit (ASIC), a field-programmable gate array (FPGA), a general purpose processor, a network processor, and a network traffic forwarding device;
   wherein the network controller device comprises at least one of an application specific integrated circuit (ASIC), a field-programmable gate array (FPGA), a general purpose processor, a network processor, and a network traffic forwarding device; and
   wherein the network controller device is capable of switching network traffic between the traditional network and the direct interconnect network without intervention by the host device.

3. The dedicated network gateway device according to claim 1 wherein the at least one computation device comprises a direct interconnect and traditional device that is internally connected to each of the first port and the second port;
   wherein the direct interconnect and traditional device comprises at least one of an application specific integrated circuit (ASIC), a field-programmable gate array (FPGA), a general purpose processor, a network processor, and a network traffic forwarding device; and
   wherein the direct interconnect and traditional device is capable of switching network traffic between the traditional network and the direct interconnect network without intervention by the host device.

4. The dedicated network gateway device according to claim 1 wherein the second port is connected to at least one of switch and router ports in the traditional network.

5. The dedicated network gateway device according to claim 1, wherein the second port is connected to the traditional network via at least one of a traditional network switch application-specific integrated circuit (ASIC), a network controller ASIC, a field-programmable gate array (FPGA), a general purpose processor, a network processor, and a network traffic forwarding device.

6. The dedicated network gateway device according to claim 1, wherein the first port takes the place of a device within the direct interconnect network.

7. The dedicated network gateway device according to claim 1, wherein the first port further comprises a plurality of links that are connected to a respective plurality of nodes/devices within the direct interconnect network.

8. A dedicated network gateway device capable of at least one of bridging, switching and routing network traffic between a traditional network and a direct interconnect network comprising:
a host interface card comprising:
a first port that is a direct interconnect port configured to be connected to the direct interconnect network;
a direct interconnect application-specific integrated circuit (ASIC) internally connected to the first port;
a second port that is a traditional network port configured to be connected to at least one of switches and devices that form the traditional network; and
a network controller application specific integrated circuit (ASIC) internally connected to the second port and internally connected to the direct interconnect ASIC;
wherein the dedicated network gateway device is capable of bridging, switching or routing network traffic between the traditional network and the direct interconnect network;
wherein the host interface card is adapted to be connected to a host device via a communication bus;
wherein the network controller ASIC is operable to switch network traffic between the traditional network and the direct interconnect network without intervention by the host device; and
wherein the first port is configured to be connected to the direct interconnect network via a network traffic forwarding device that is capable of acting as a direct interconnect node with locally destined/sourced traffic sent over a traditional network interface.

9. The dedicated network gateway device according to claim 8 wherein the second port is connected to at least one of switch and router ports in the traditional network.

10. The dedicated network gateway device according to claim 8, wherein the second port is connected to the traditional network via at least one of a traditional network switch application-specific integrated circuit (ASIC), a network controller ASIC, a field-programmable gate array (FPGA), a general purpose processor, a network processor, and a network traffic forwarding device.

11. The dedicated network gateway device according to claim 8, wherein the first port further comprises a plurality of links that are connected to a respective plurality of nodes/devices within the direct interconnect network.

12. A dedicated network gateway device capable of at least one of bridging, switching and routing network traffic between a traditional network and a direct interconnect network comprising:
a host interface card comprising:
a first port that is a direct interconnect port configured to be connected to the direct interconnect network; and
a second port that is a traditional network port configured to be connected to at least one of switches and devices that form the traditional network;
wherein the first port and the second port are internally connected to a direct interconnect and traditional application specific integrated circuit (ASIC);
wherein the dedicated network gateway device is capable of bridging, switching or routing network traffic between the traditional network and the direct interconnect network;
wherein the host interface card is adapted to be connected to a host device via a communication bus;
wherein the direct interconnect and traditional ASIC is operable to switch network traffic between the traditional network and the direct interconnect network without intervention by the host device;
wherein the first port is configured to be connected to the direct interconnect network via a network traffic forwarding device that is capable of acting as a direct interconnect node with locally destined/sourced traffic sent over a traditional network interface.

13. The dedicated network gateway device according to claim 12 wherein the second port is connected to at least one of switch and router ports in the traditional network.

14. The dedicated network gateway device according to claim 12, wherein the second port is connected to the traditional network via at least one of a traditional network switch application-specific integrated circuit (ASIC), a network controller ASIC, a field-programmable gate array (FPGA), a general purpose processor, a network processor, and a network traffic forwarding device.

15. The dedicated network gateway device according to claim 12, wherein the first port takes the place of a device within the direct interconnect network.

16. A dedicated network gateway device for at least one of bridging and routing network traffic between a traditional network and a direct interconnect network, comprising:
a first set of traditional network ports with a single link per port, such ports being connected to end devices that form a first traditional network; and
a second set of direct interconnect ports with two or more links per port, such ports being connected to the direct interconnect network;
wherein said direct interconnect network acts as a backbone that allows network traffic to route from the dedicated network gateway device to at least one other dedicated network gateway device, the dedicated network gateway device and the at least one other dedicated network gateway device being defined as a plurality of gateway devices;
wherein the at least one other dedicated network gateway device comprises:
a first set of traditional network ports with a single link per port, such ports being connected to end devices that form a second traditional network; and
a second set of direct interconnect ports with two or more links per port, such ports being connected to the direct interconnect network;
wherein the plurality of gateway devices comprises a coordination function that assigns one or more direct interconnect nodes within the direct interconnect network to each of the at least one direct interconnect ports so only one of the direct interconnect ports processes the network traffic for a given flow; and
wherein the coordination function further comprises an efficiency function that regulates the direct interconnect ports so that the direct interconnect port that first receives network traffic for a given flow, which was destined for a different direct interconnect port on the same dedicated network gateway device, will process the network traffic for the given flow rather than forwarding the network traffic to the originally destined direct interconnect port.

17. The dedicated network gateway device of claim 16, further comprising:
at least one direct interconnect computation device internally connected to the direct interconnect ports of the gateway device; and a switch computation device internally connected to the traditional ports of the gateway device;

wherein the switch computation device is internally connected to the at least one direct interconnect computation device.

18. The dedicated network gateways device of claim 17, wherein the gateway device further comprises a coordination device that is in communication with the at least one direct interconnect computation device via a coordination hub;

wherein the coordination hub is configured facilitate communication of coordination information and decisions;

wherein the coordination function is centralized on the coordination device.

19. The dedicated network gateway device of claim 16, wherein the first set of traditional ports is connected to the traditional network via at least one of a traditional network switch application-specific integrated circuit (ASIC), a network controller ASIC, a field-programmable gate array (FPGA), a general purpose processor, a network processor, and a network traffic forwarding device.

20. The dedicated network gateway device of claim 16, wherein the first set of traditional ports is connected to at least one of switch and router ports in the traditional network.

21. The dedicated network gateway device of claim 16, wherein the second set of direct interconnect ports is connected to the direct interconnect network via at least one of a dedicated interconnect application-specific integrated circuit (ASIC), a field-programmable gate array (FPGA), a general purpose processor, a network processor, a passive patch panel/hub, and a network traffic forwarding device.

22. The dedicated network gateway device according to claim 21, wherein the network traffic forwarding device is capable of acting as a direct interconnect node with locally destined/sourced traffic sent over a traditional network interface.

23. A dedicated network gateway device for at least one of bridging, switching and routing network traffic between a traditional network and a direct interconnect network, comprising:

a first set of at least one traditional network ports with a single link per port, said first set of ports being connected to at least one of switches and devices that form the traditional network;

a second set of at least one direct interconnect ports with one or more links per port, said second set of ports being connected to the direct interconnect network;

a plurality of direct interconnect ports that are logically associated by the gateway device to act as a single direct interconnect node;

at least one direct interconnect computation device internally connected to at least one of the plurality of logically associated direct interconnect ports;

a switch computation device internally connected to each of the respective amount of the at least one direct interconnect device and the first set of traditional network ports; and a coordination bus internally connected to the respective amount of the at least one direct interconnect computation device;

wherein the coordination bus is configured to facilitate communication of coordination information and decisions;

wherein the dedicated network gateway device is capable of bridging, switching or routing network traffic between the traditional network and the direct interconnect network; and wherein the gateway device further comprises a coordination function that is distributed across the respective amount of at least one direct interconnect computation device that assigns one or more direct interconnect nodes within the direct interconnect network to each of the at least one logically associated direct interconnect ports so that only one of the logically associated direct interconnect ports processes the network traffic for a given flow.

24. The dedicated network gateway device of claim 23, wherein the coordination function is centralized in the at least one direct interconnect computation device.

25. The dedicated network gateway device of claim 23, further comprising a coordination computation device that is internally connected to the coordination bus; and wherein the coordination function is centralized in the coordination computation device.

26. The dedicated network gateway device of claim 23, wherein the at least one direct interconnect computation device comprises at least one of a dedicated interconnect application-specific integrated circuit (ASIC), a field-programmable gate array (FPGA), a general purpose processor, a network processor, and a network traffic forwarding device.

27. The dedicated network gateway device of claim 23, wherein the switch computation device comprises at least one of a dedicated switch application-specific integrated circuit (ASIC), a field-programmable gate array (FPGA), a general purpose processor, a network processor, and a network traffic forwarding device.

28. That dedicated network gateway device of claim 23, wherein the first set of at least one traditional network ports is connected to the traditional network via at least one of a traditional network switch application-specific integrated circuit (ASIC), a network controller ASIC, a field-programmable gate array (FPGA), a general purpose processor, a network processor, and a network traffic forwarding device.

29. The dedicated network gateway device of claim 23, wherein the second set of at least one direct interconnect ports is connected to the direct interconnect network via at least one of a dedicated interconnect application-specific integrated circuit (ASIC), a field-programmable gate array (FPGA), a general purpose processor, a network processor, a passive patch panel/hub, and a network traffic forwarding device.

30. The dedicated network gateway device of claim 23, wherein the coordination function further comprises a efficiency function that regulates the direct interconnect ports so that the direct interconnect port that first receives network traffic for a given flow, which was destined for a different direct interconnect port on the same dedicated network gateway device, will process the network traffic for the given flow rather than forwarding the network traffic to the originally destined direct interconnect port.

* * * * *